(12) United States Patent
Hugo

(10) Patent No.: US 7,521,118 B2
(45) Date of Patent: Apr. 21, 2009

(54) FLAT ELEMENT HAVING A DARK SURFACE EXHIBITING A REDUCED SOLAR ABSORPTION

(75) Inventor: Gerd Hugo, Schondorf (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 10/343,860

(22) PCT Filed: Aug. 3, 2001

(86) PCT No.: PCT/EP01/09020

§ 371 (c)(1),
(2), (4) Date: Aug. 14, 2003

(87) PCT Pub. No.: WO02/12405

PCT Pub. Date: Feb. 14, 2002

(65) Prior Publication Data

US 2004/0018360 A1    Jan. 29, 2004

(30) Foreign Application Priority Data

Aug. 7, 2000    (DE)    ................. 100 38 381

(51) Int. Cl.
*B32B 9/04*    (2006.01)
*B05D 3/00*    (2006.01)

(52) U.S. Cl. ................. 428/411.1; 428/401; 428/423.1; 428/425.9; 428/473.5; 428/474.4; 428/480; 428/500; 427/372.2

(58) Field of Classification Search .............. 428/411.1, 428/423.1, 423.3, 423.5, 423.7, 424.6, 424.8, 428/425.1, 425.5, 447, 452, 473.5, 474.4, 428/474.9, 323, 372, 401, 421, 425.9, 480, 428/500; 427/180, 202, 372.2

See application file for complete search history.

(56) References Cited

U.S. PATENT DOCUMENTS

| | | | |
|---|---|---|---|
| 3,429,727 A * | 2/1969 | Hochberg | .................... 427/209 |
| 3,551,830 A * | 12/1970 | Hodge et al. | .................. 442/76 |
| 3,639,166 A * | 2/1972 | Fellows et al. | .............. 428/327 |
| 4,135,925 A * | 1/1979 | Wells | .......................... 430/33 |
| 4,311,623 A | 1/1982 | Supcoe | |
| 4,546,045 A * | 10/1985 | Elias | ....................... 428/424.6 |
| 4,916,014 A | 4/1990 | Weber et al. | |
| 5,540,998 A | 7/1996 | Yamada et al. | |
| 5,962,143 A | 10/1999 | Krauthäuser et al. | |
| 6,194,484 B1 * | 2/2001 | Hugo | ......................... 523/135 |

FOREIGN PATENT DOCUMENTS

| | | |
|---|---|---|
| EP | 1 127 926 | 8/2001 |
| EP | 1127926 A1 * | 8/2001 |
| WO | 00/24833 | 5/2000 |

* cited by examiner

*Primary Examiner*—Thao T. Tran
(74) *Attorney, Agent, or Firm*—The Nath Law Group; Jerald L. Meyer; Stanley N. Protigal

(57) ABSTRACT

The invention relates to a flat element comprised of a substrate and of at least one coating that covers the substrate. Both the substrate and the surface are darkly imbued in the visible spectral range. In the near infrared range, this assembly has a high degree of reflection in order to, despite the dark imbuement in the visible spectral range, reduce the heating caused by sunlight.

13 Claims, 11 Drawing Sheets

FLAT ELEMENT HAVING A DARK SURFACE EXHIBITING A REDUCED SOLAR ABSORPTION

FIELD OF THE INVENTION

Figure 1:
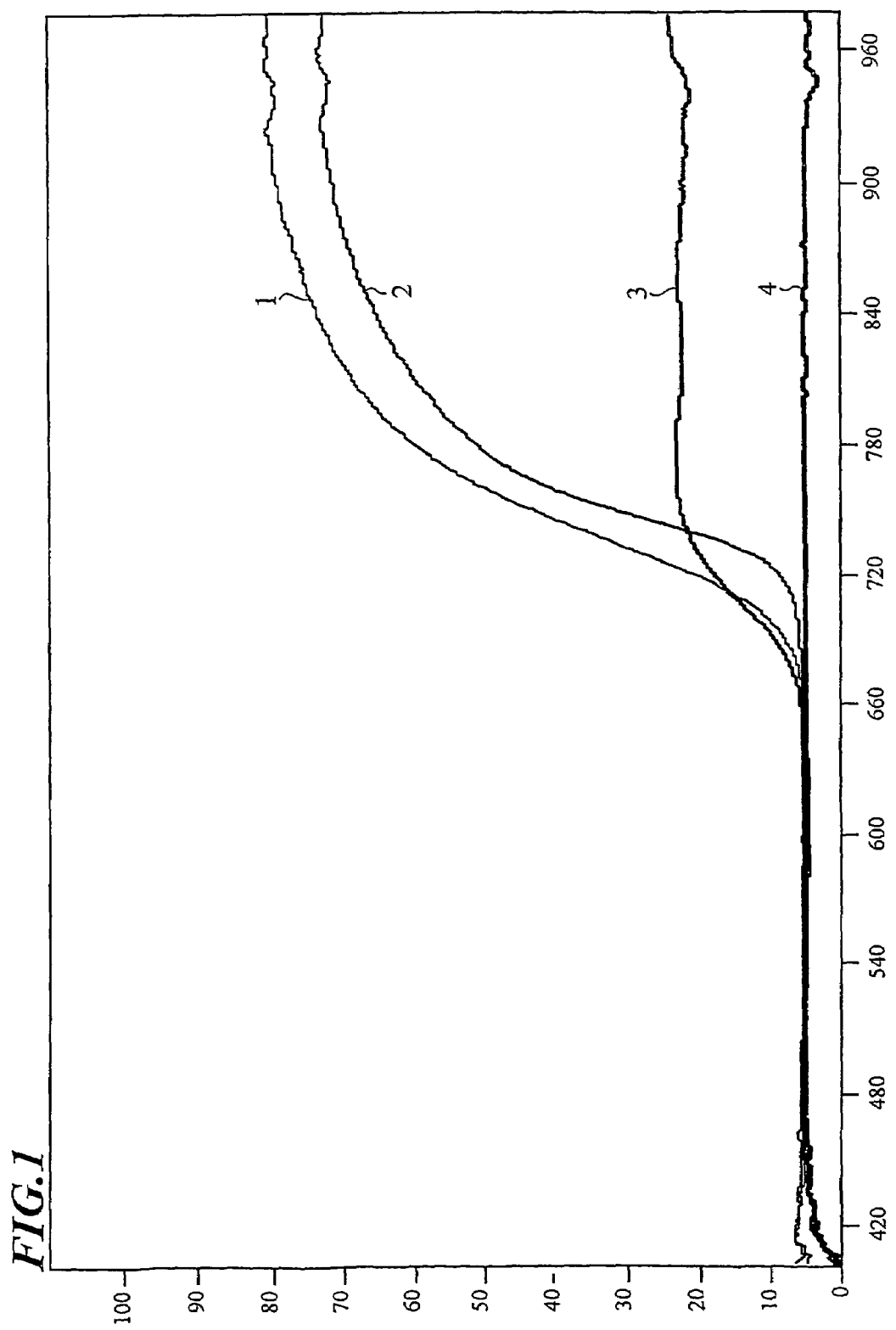

The present invention relates to a flat element comprising a substrate and a coating of the substrate whereby both the substrate and the surface of the flat element are pigmented coloured dark in the visible light range. In the near-infrared range the flat element has high reflection so as to reduce it becoming heated up in sunlight despite the dark pigmentation colour in the visible light range. Such a flat element finds application on all surface areas needing to be pigmented coloured dark for aesthetic or technical reasons but which should not heat up when exposed to sunlight and in cases where the dark colour is maintained even when the coating is damaged.

PRIOR ART

Surfaces which need to be coloured dark for aesthetic or technical reasons and which are exposed to sunlight have the usual nuisance tendency to become more or less heated up depending on how dense the colouration is.

It is particularly in confined spaces such as e.g. in a vehicle be it an automobile, a truck, a bus or also the interiors of railcars that this solar heating up of dark surface areas is experienced as a real nuisance. The dark surface areas heat up more or less, depending on their degree of solar absorption and give off their heat into the interior of the vehicle. This heat then requires compensating with an air-conditioning system which adds to the energy consumption of the vehicle quite considerably.

In any vehicle there are surface areas which for technical reasons need to be coloured dark. One good example of this is the dashboard top in an automobile. Were it coloured bright it would reflect in the windscreen and prove a nuisance to the driver's view ahead. This is why it naturally needs to be coloured dark. Since this surface area is located directly under the windshield it is exposed the most to solar radiation and heats up accordingly. Apart from the nuisance of this heating up the vehicle, this increase in temperature of dark surfaces also results in accelerated material fatigue of the surface areas involved.

It is more for aesthetic reasons that leather seats in automobiles are mainly coloured dark grey, indeed mostly even black. When this vehicle has been standing in the sun for quite some time with the leather seats exposed to the sunlight, they heat up so much they become almost unbearably hot.

Even more of a nuisance is the heating up of steering wheels in sunlight since they usually need gripping with the bare hand without any cladding.

Proposed in PCT/EP96/04703 is a means for producing coatings reflecting heat radiation. This describes a coating having a higher reflection for sunlight in the near-infrared range. The drawback in this case is that all substances result in higher reflection for sunlight in the near-infrared range need to be incorporated in a single layer.

This has the result that when producing very dark or black tints the reflection for sunlight in the near-infrared range is only slightly higher since the higher the filling with reflective substances the more the reflection increases also in the visible light range.

Another disadvantage is that when the coating is damaged the normal undercoat is exposed having no enhanced sunlight reflection, thus negating the effect at this location.

Were the undercoat coloured white this would restore the enhanced reflection to sunlight but for aesthetic reasons this is not possible since everywhere where the coating becomes damaged or is no longer present the white undercoat would "grin" through.

It is thus the objective of the present invention to provide a substrate which, having the same colouration in the visible light range as the coating thereon, shows a high reflection in the near-infrared range and is provided with a coating which in the visible light range is dark and in the near-infrared range is mainly transparent and/or self-reflective and which with a normal pigment fill also satisfies all mechanical requirements in later application.

DISCLOSURE OF THE INVENTION

In accordance with the invention this is achieved by a flat element having a dark surface and exhibiting a reduced solar absorption comprising
a) a substrate whose reflection in the visible light range from 380 to 720 nm is less than 50% and in the near-infrared range from 720 to 1500 nm exceeds 60%,
b) a coating of the substrate comprising a binder which in the spectral range of 380 to 1500 nm has a transparency exceeding 70%, and first pigments which in the visible light range from 380 to 720 nm result in a reduced reflection of the coating less than 50% and in the spectral range of the near-infrared range from 720 to 1500 nm show a transparency exceeding 50%, and/or second pigments which in the visible light range from 380 to 720 nm result in a reduced reflection of the coating less than 50% and in the spectral range of the near-infrared range from 720 to 1500 nm show a reflection exceeding 40%, preferably exceeding 50%, particularly preferred exceeding 60%.

The coating may also be applied to the substrate in a single layer or several thin layers.

"Dark" in the context of the present application is to be understood that the reflection of the system in the wavelength range of visible light from 380 to 720 nm is less than 50%. Reflection in this sense is understood to be the reflection as averaged over the cited wavelength range; the same applying to the terms "transmittance", "absorption" and "backscatter".

Advantageous aspects of the gist of the invention read from the sub-claims.

One advantageous aspect of the gist of the invention results from the substrate being a fibrous material selected from the group of plastics, selected from artificial leather, selected from non-wovens or wovens of polyethylene, polypropylene, polyester, nylon and acetates such as cellulose acetate, from the group of natural materials, selected from leather, selected from non-wovens or wovens from sisal, hemp, cellulose, cotton and from silk.

An advantageous aspect of the gist of the invention results from the substrate being a foamed, preferably reactive and/or mechanically foamed material, selected from the group of plastics, selected from polyethylene, polypropylene, polyester, nylon, ABS, epoxy, polyurethane and PVC.

Another advantageous aspect of the gist of the invention results from the substrate being a material selected from the group of plastics, selected from polyethylene, polypropylene, polyester, nylon, ABS, epoxy, polyurethane and PVC and filled with fillers to 40 to 80 volume percent having in the wavelength range 380 to 1500 nm a transparency exceeding 70% and whose particle size is selected so that they have a low backscatter in the visible light range. In accordance with the invention a backscatter is low when it amounts to less than 50% of the incident radiation.

Another advantageous aspect of the gist of the invention results from the substrate being formed after drying from an initially fluid binder filled with fillers to 40 to 80 volume percent having in the wavelength range 380 to 1500 nm a transparency exceeding 70% and whose particle size is selected so that they have a low backscatter in the visible light range.

In accordance with the invention it is preferred that the reflection of the substrate in the visible light range from 380 to 720 nm being less than 50% is caused by colouration with soluble dyes or pigments.

The soluble dyes are preferably water-soluble dyes or dyes soluble in solvents. The group of water-soluble dyes comprises acidic dyes, substantive dyes, basic dyes, developed dyes, sulphuric dyes and aniline dyes; the group of dyes soluble in organic solvents comprises more preferably zapon dyes. The soluble dyes are employed preferably in a quantity of 0.2 to 10% by weight, preferably 2 to 6% by weight relative to the formulation.

Another advantageous aspect of the gist of the invention results from the first pigments which in the visible light range from 380 to 720 nm result in a reduced reflection of the coating less than 50% and in the spectral range of the near-infrared range from 720 to 1500 nm show a reflection exceeding 50% being selected from the group of organic pigments, selected from the group of azo pigments, selected from monoazo, disazo, β-naphthol, naphthol AS, lacquered azo, benzimidazolon, disazo condensation, metal complex, isoindolinon and isoindolin pigments, being selected from the group of polycyclic pigments, selected from phthalocyanine, chinacridon, perylene and perinon, thioindigo, anthraquinone, anthrapyrimidin, flavanthrone, pyranthrone, anthanthrone, dioxazine, triarylcarbonium, chino-phthalone, diketo-pyrrolo-pyrrole pigments. The first pigments are employed preferably in a quantity of 0.2 to 20% by weight, preferably 0.7 to 10% by weight relative to the total formulation for producing the coating.

Yet another advantageous aspect of the gist of the invention results from the second pigments which in the visible light range from 380 to 720 nm result in a reduced reflection of the coating less than 50% and in the spectral range of the near-infrared range from 720 to 1500 nm show a reflection exceeding 40% being selected from the group of inorganic pigments, selected from the group of metal oxides and hydroxides, from cadmium, bismuth, chromium, ultramarine pigments, selected from the group of coated, laminar mica pigments, selected more preferably from the group of rutile and spinelle mixed phase pigments. The second pigments are employed preferably in a quantity of 4 to 50% by weight, preferably 10 to 40% by weight relative to the total formulation for producing the coating.

Yet another advantageous aspect of the gist of the invention results from the fillers being selected from the group of degradable minerals, selected from metal oxides, selected from aluminum oxide, magnesium oxide, quartz, selected from blends of metal oxides, selected from zirconium silicate, clay, selected from metal carbonates, selected from calcium carbonate, selected from metal sulfates, selected from barium sulfate, the average particle size of which is set by grinding to an average of 1 to 3 μm. The fillers are preferably employed in a quantity of 1 to 45% by weight, more preferably 8 to 35% by weight with respect to the formulation.

Still another advantageous aspect of the gist of the invention results from the binder being selected from the group of solvent-based binders comprising acrylates, methacrylates, styrene-acrylates, styrene-methacrylates, selected from substituted polyolefins, selected from polystyrene and styrene copolmers, alkyd resins, selected from saturated and non-saturated polyesters or polyamides, polyimides, polyurethanes, polyethers, epoxy resins, silicones, chlorosulfonated polyethylene, fluorated polymers selected from fluorated acrylic copolymers or fluorosilicones;

selected from the group of aqueous binders comprising the group of aqueous binders from alkyd resins, polyesters, polyacrylates, epoxides and epoxide esters, from the group of aqueous dispersions and emulsions, comprising dispersions and emulsions based on acrylate, methacrylate, styrene acrylate, polyethylene, polyethylene oxidate, ethylene acrylic acid copolymers, methacrylate, vinylpyrrolidone-vinylacetate copolymers, polyvinylpyrrolidone, polyisopropylacrylate, polyurethanes, wax dispersions based on polyethylene, polypropylene, Teflon®, synthetic waxes, fluorated polymers, fluorated acrylic copolymer in aqueous solution, fluorosilicones.

The binders are advantageously employed in a quantity of 20 to 90% by weight, preferably 30 to 80% by weight, relative to the total formulation for producing the coating.

Still another advantageous aspect of the gist of the invention results from the average particle size of the first pigments being smaller than 0.9 μm and the average particle size of the second pigments being greater than or equal to 0.9 μm.

Still another advantageous aspect of the gist of the invention results from the reflection of the substrate in the spectral range 720 to 1500 nm exceeding 70%.

Yet another advantageous aspect of the gist of the invention results from the reflection of the substrate with soluble dyes and/or the coating in the spectral range of visible light from 380 to 720 nm being less than 40%.

Still another advantageous aspect of the gist of the invention results from the first and/or second pigments in the spectral range of visible light from 380 to 720 nm resulting in a low reflection of the coating of the substrate of less than 40%.

Still another advantageous aspect of the gist of the invention results from the mechanical foam being formed by the inclusion of hollow microbeads of glass or plastics.

Yet another advantageous aspect of the gist of the invention results from layer thicknesses of the substrate being in the range 10 μm to 8 mm, more particularly in the range from 20 μm to 6 mm.

Still another advantageous aspect of the gist of the invention results from layer thicknesses of the coating being in the range 10 μm to 500 μm, more particularly in the range from 20 μm to 300 μm.

FIGURES

FIGS. 1 to 11 show curves depicting the hemispherical backscatter as plotted by the Avantes PC spectrometer module PC 2000 with a spectral sensitivity of 320 to 1100 nm with an Ulbricht sphere connected thereto for the substrates or elements contained in the examples 1 to 7 and 10 to 13, respectively.

EXAMPLES

The subject matter of the invention will now be detailed by way of examples.

Example 1

Coating a Leather and Comparison Example a) A leather was dyed black with the following mixture:
   Acid Black Mixture: (Sella Fast Black® HS-02 and Sella Fluid Black® M-M Made by TFL USA/Canada Inc.).

b) The leather dyed as per a) was coated black with

| | |
|---|---|
| 80.00 g | Rodia Base ® VL 8108 made by TFL USA/Canada Inc. (binder) |
| 15.00 g | tinting paste black comprising: 20 parts by weight Paliogen ® Schwarz L0086 made by BASF, 80 parts by weight butylene glycol, |
| 0.90 g | QWD 0108 Magenta made by Sun Chemicals, |
| 12.00 g | water. |

The coating was applied wet with a spiral applicator 3×100 μm to the dyed leather and then dried.

Comparison Example

A standardized black pre-dyed leather was coated with a black standardized coating. The standardized coating consists of an acrylic-copolymer emulsion and an aqueous polyurethane dispersion formulated as specified for the particular application with commercially available waxes, fillers, casein and oil. For blackening black ferrous oxide, an aqueous pigment dispersion of and an aqueous dispersion of carbon black was added to this binder mixture.

The spectral reflection of the samples was plotted in the range 400 to 980 nm (measuring apparatus: Avantes PC spectrometer module PC 2000 with a spectral sensitivity of 320 to 1100 nm with an Ulbricht sphere for measuring the hemispherical backscatter of surfaces); the plotted results are illustrated in FIG. 1.

The plotted results as shown in FIG. 1 illustrate (1) the spectral reflection of the dyed leather to be used in accordance with the invention in accordance with example 1a), (2) the spectral reflection of the leather coated in accordance with the invention in accordance with example 1b) and (3) the spectral reflection of the standardized dyed leather and (4) the spectral reflection of the standardized coated leather in accordance with the comparison example.

The samples were bonded to a panel of expanded polystyrene and measured with a radiation thermometer exposed to 98000 Lx solar radiation.

The black leather coated in accordance with the invention heated up to 54° C.

The black leather in accordance with the comparison example heated up to 67° C.

Example 2

Coating a Leather and Comparison Example a) A leather was dyed grey with the following mixture:
Acid Black 213 (Sella Fast Grey® C-LL Made by TFL USA/Canada Inc.).

b) A grey coating was produced from

| | |
|---|---|
| 80.00 g | Rodia Base ® VL 8108 made by TFL USA/Canada Inc. (binder) |
| 03.50 g | tinting paste black comprising: 20 parts by weight Paliogen ® Schwarz L0086 made by BASF, 80 parts by weight butylene glycol, |
| 10.50 g | Ropaque ® OP 62 made by Rohm &Haas, |
| 00.13 g | QWD 0108 Magenta made by Sun Chemicals, |
| 12.00 g | water. |

The coating was applied wet with a spiral applicator 3×100 μm to the leather dyed as per a).

Comparison Example

A standardized grey pre-dyed leather was coated with a grey standardized coating. The standardized coating consists of an acrylic-copolymer emulsion and an aqueous polyurethane dispersion formulated as specified for the particular application with commercially available waxes, fillers, casein and oil. For greying an aqueous pigment dispersion of titanium dioxide (rutile), black ferrous oxide and an aqueous dispersion of carbon black was added to this binder mixture.

Figure 2:
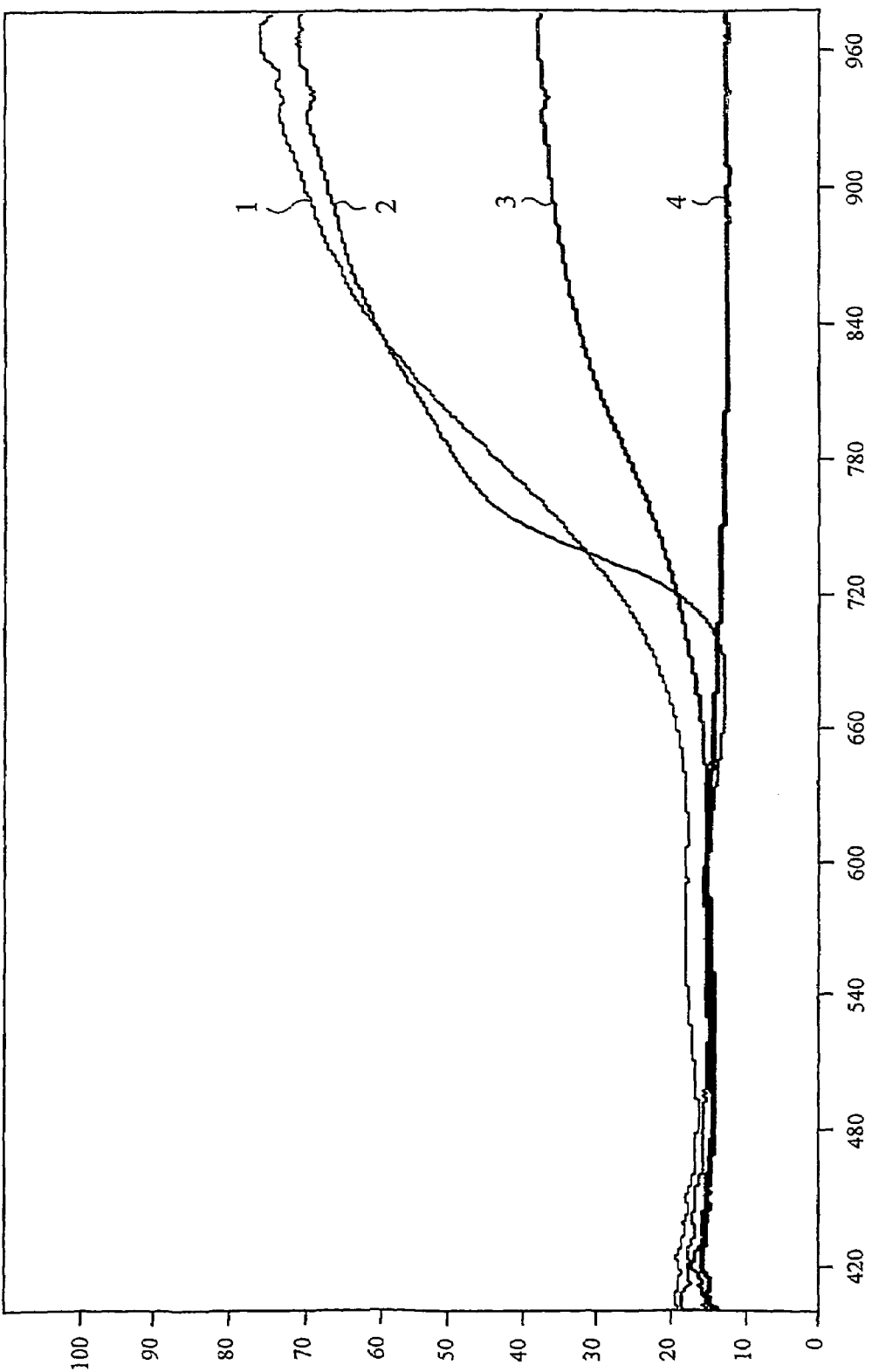

The spectral reflection of the samples was plotted in the range 400 to 980 nm; the plotted results are illustrated in FIG. 2.

The plotted results as shown in FIG. 2 illustrate (1) the spectral reflection of the dyed leather to be used in accordance with the invention in accordance with example 2a), (2) the spectral reflection of the leather coated in accordance with the invention in accordance with example 2b) and (3) the spectral reflection of the standardized grey dyed leather and (4) the spectral reflection of the standardized grey coated leather in accordance with the comparison example.

The samples were bonded to a panel of expanded polystyrene and measured with a radiation thermometer exposed to 98000 Lx solar radiation.

The grey leather coated in accordance with the invention heated up to 53.5C. The grey leather in accordance with the comparison example heated up to 64.5° C.

Example 3

Coating a Woven and Comparison Example a) A woven of bleached linen was pre-dyed black with the water-soluble dyes D&C Red #33 and D&C Green #5 made by Simple Pleasures, old Saybrook, Conn. 06474-1253, USA.

b) The woven was coated black with

| | |
|---|---|
| 80.00 g | Rodia Base ® VL 8108 made by TFL USA/Canada Inc. (binder) |
| 15.00 g | tinting paste black comprising: 20 parts by weight Paliogen ® Schwarz L0086 made by BASF, 80 parts by weight butylene glycol, |
| 00.90 g | QWD 0108 Magenta made by Sun Chemicals, |
| 12.00 g | water. |

The coating was applied wet with a spiral applicator 3×100 μm to the dyed woven.

Comparison Example

A standardized black dyed woven was coated with a black standardized coating. The standardized coating consists of an acrylic-copolymer emulsion and an aqueous polyurethane dispersion. For blackening an aqueous pigment dispersion of black ferrous oxide and an aqueous dispersion of carbon black was added to this binder mixture.

Figure 3:
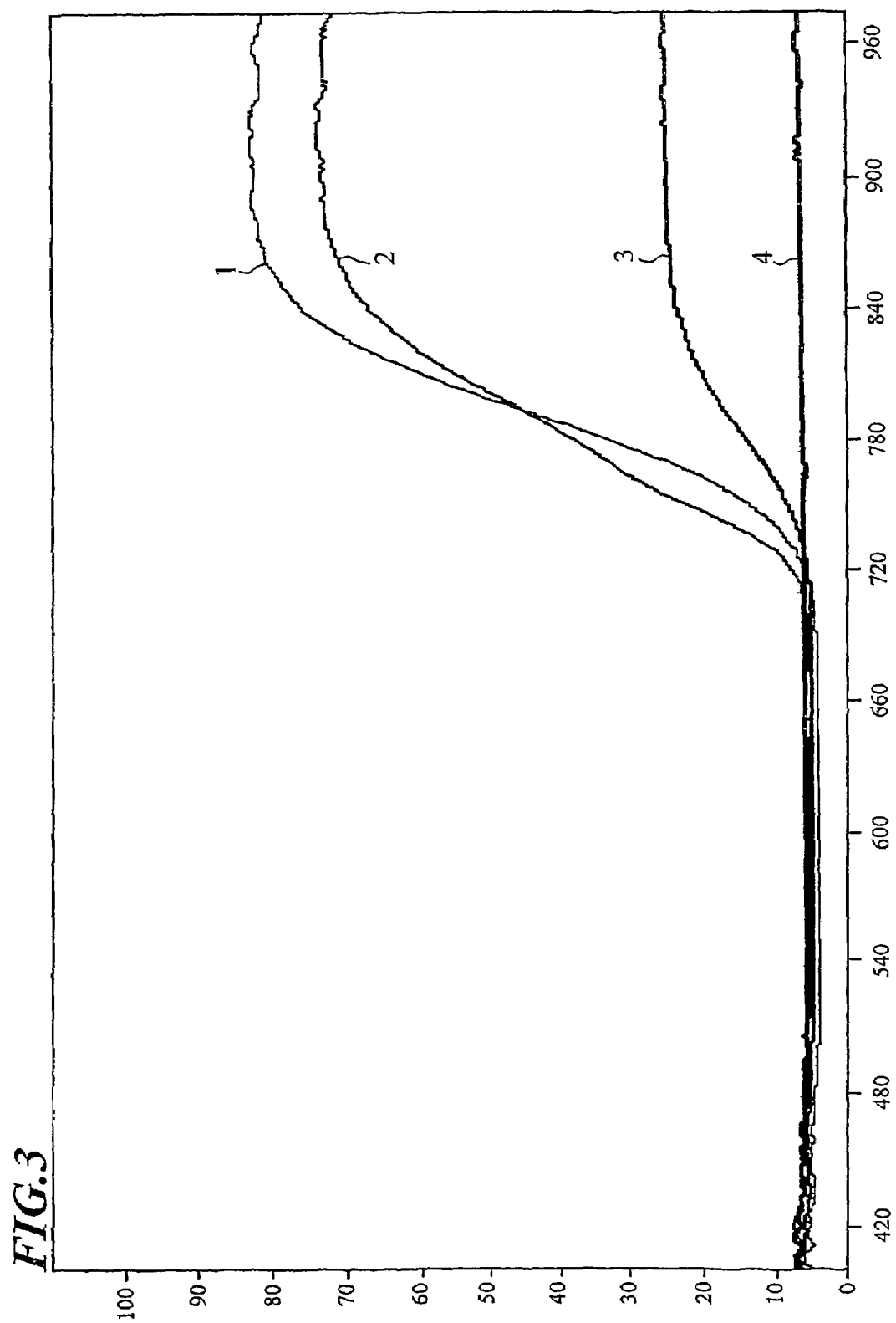

The spectral reflection of the samples was plotted in the range 400 to 980 nm; the plotted results are illustrated in FIG. 3.

The plotted results as shown in FIG. 3 illustrate (1) the spectral reflection of the dyed woven to be used in accordance with the invention in accordance with example 1a), (2) the spectral reflection of the woven coated in accordance with the invention in accordance with example 1b) and (3) the spectral reflection of the standardized dyed woven and (4) the spectral reflection of the standardized coated woven in accordance with the comparison example.

The samples were bonded to a panel of expanded polystyrene and measured with a radiation thermometer exposed to 98000 Lx solar radiation.

The black woven coated in accordance with the invention heated up to 54.5° C. The black woven in accordance with the comparison example heated up to 67.5° C.

Example 4

Coating a Non-Woven and Comparison Example a) A non-woven of polyethylene random laid non-woven was dyed dark grey to black with a mixture of Zapon® Schwarz X 50 made by BASF and a nitro thinner:
b) The non-woven was coated grey with

| | |
|---|---|
| 80.00 g | Rodia Base ® VL 8108 made by TFL USA/Canada Inc. |
| 03.50 g | tinting paste black comprising: |
| | 20 parts by weight Paliogen ® Schwarz L0086 made by BASF, |
| | 80 parts by weight butylene glycol, |
| 10.50 g | Ropaque ® OP 62 made by Rohm &Haas, |
| 00.13 g | QWD 0108 Magenta made by Sun Chemicals, |
| 12.00 g | water. |

The coating was applied wet with a spiral applicator 3×100 µm to the pre-dyed random laid non-woven and then dried.

Comparison Example

The same random laid non-woven was coated with a grey standardized coating. The standardized coating consists of an acrylic-copolymer emulsion and an aqueous polyurethane dispersion. For greying, an aqueous pigment dispersion of titanium dioxide (rutile), black ferrous oxide and an aqueous dispersion of carbon black was added to this binder mixture.

Figure 4:
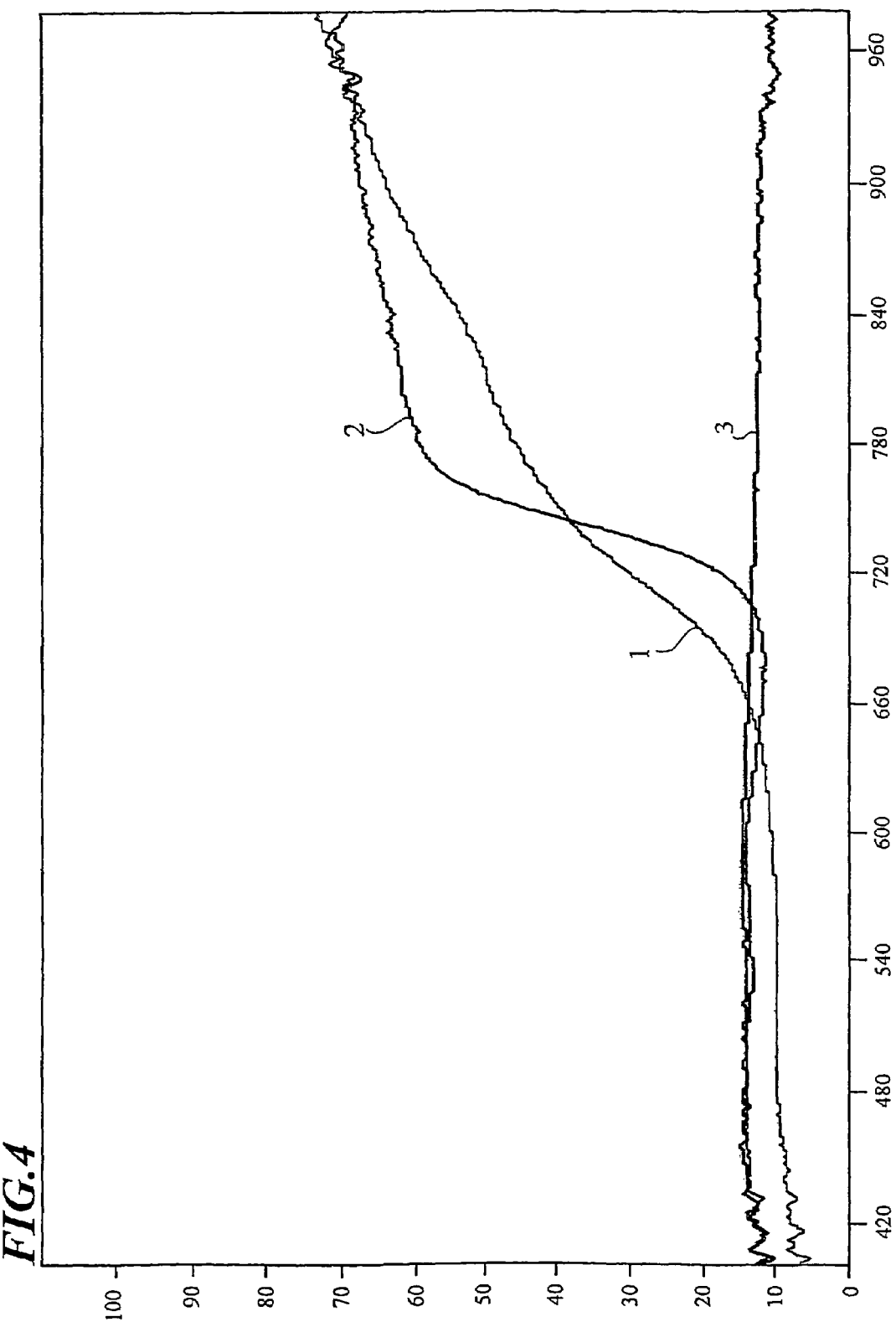

The spectral reflection of the samples was plotted in the range 400 to 980 nm; the plotted results are illustrated in FIG. 4.

The plotted results as shown in FIG. 4 illustrate (1) the spectral reflection of the dyed random laid non-woven to be used in accordance with the invention in accordance with example 4a), (2) the spectral reflection of the random laid non-woven coated in accordance with the invention in accordance with example 4b), and (3) the spectral reflection of random laid non-woven according to the comparative example.

The samples were bonded to a panel of expanded polystyrene and measured with a radiation thermometer exposed to 98000 Lx solar radiation.

The grey random laid non-woven coated in accordance with the invention heated up to 52.5° C. The grey random laid non-woven in accordance with the comparison example heated up to 63.5° C.

Example 5

Coating a Pigmented Panel of Epoxy Resin a) An evenly grey pigmented panel of epoxy was blended as follows:

| | |
|---|---|
| 100.00 g | laminating resin L 160 made by Scheufler Stuttgart |
| 25.00 g | hardener H 160 made by Scheufler Stuttgart |
| 50.00 g | Ferro PK 0032 white pigment made by Ferro |
| 25.00 g | Ferro PK 3080 black pigment made by Ferro |
| (particle size: 0.9 µm) | | b) The panel was coated grey with

| | |
|---|---|
| 80.00 g | Rodia Base ® VL 8108 made by TFL USA/Canada Inc. |
| 03.50 g | tinting paste black comprising: |
| | 20 parts by weight Paliogen ® Schwarz L0086 made by BASF, |
| | 80 parts by weight butylene glycol, |
| 10.50 g | Ropaque ® OP 62 made by Rohm &Haas, |
| 00.13 g | QWD 0108 Magenta made by Sun Chemicals, |
| 12.00 g | water. |

The coating was applied wet with a spiral applicator 3×100 µm to the evenly grey pigmented panel of epoxy resin.

Comparison Example

A commercially available grey PVC panel was coated with a grey standardized coating. The standardized coating consists of an acrylic-copolymer emulsion and an aqueous polyurethane dispersion. For greying an aqueous pigment dispersion of titanium dioxide (rutile), black ferrous oxide and an aqueous dispersion of carbon black was added to this binder mixture.

Figure 5:
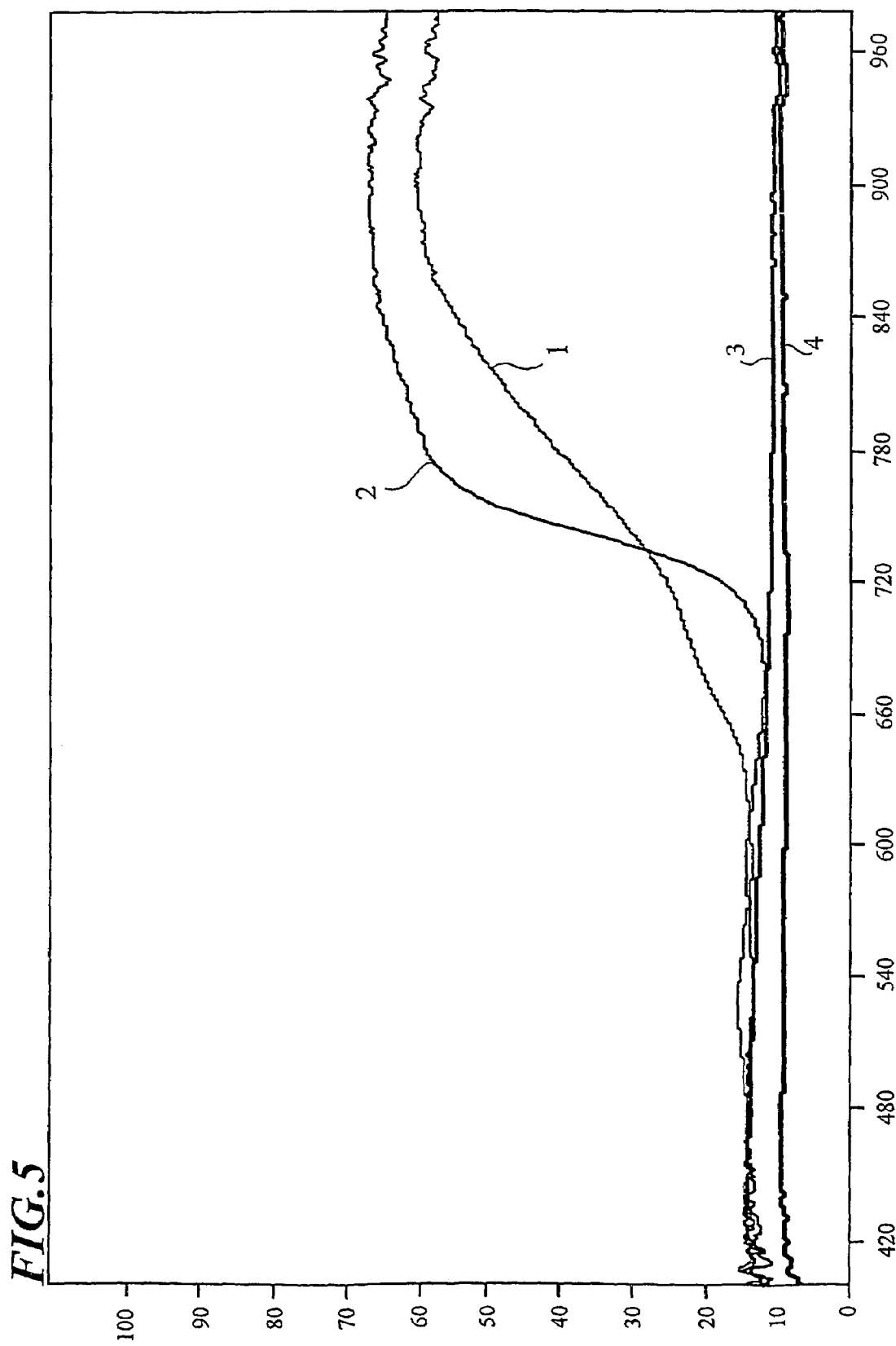

The spectral reflection of the samples was plotted in the range 400 to 980 nm; the plotted results are illustrated in FIG. 5.

The plotted results as shown in FIG. 5 illustrate (1) the spectral reflection of the pigmented epoxy resin panel to be used in accordance with the invention in accordance with example 5a), (2) the spectral reflection of the epoxy resin panel coated in accordance with the invention in accordance with example 5b), (3) the spectral reflection of the commercially available PVC panel and (4) the spectral reflection of the standardized grey pigmented PVC panel in accordance with the comparison example.

The samples were bonded to a panel of expanded polystyrene and measured with a radiation thermometer exposed to 94000 Lx solar radiation.

The grey panel coated in accordance with the invention heated up to 51.5° C. The standardized coated panel in accordance with the comparison example heated up to 61.5° C.

Example 6

Coating a Panel of Foamed Epoxy Resin a) An evenly grey pigmented panel of foamed epoxy was blended as follows:

| | |
|---|---|
| 100.00 g | laminating resin L 160 made by Scheufler Stuttgart |
| 25.00 g | hardener H 160 made by Scheufler Stuttgart |
| 7.00 g | Expancel ® 461 DE 20 made by Akzo Nobel |
| 00.65 g | QWD 0108 Magenta made by Sun Chemicals, |
| 5.35 g | tinting paste black comprising: |
| | 20 parts by weight Paliogen ® Schwarz L0086 made by BASF, |
| | 80 parts by weight butylene glycol, | b) The foamed panel was coated grey with

| | |
|---|---|
| 80.00 g | Rodia Base ® VL 8108 made by TFL USA/Canada Inc. |
| 3.50 g | tinting paste black comprising: |
| | 20 parts by weight Paliogen ® Schwarz L0086 made by BASF, |
| | 80 parts by weight butylene glycol, |
| 10.50 g | Ropaque ® OP 62 made by Rohm &Haas, |
| 0.13 g | QWD 0108 Magenta made by Sun Chemicals, |
| 12.00 g | water. |

The coating was applied wet with a spiral applicator 3×100 μm to the evenly grey pigmented panel of foamed epoxy resin and died.

Comparison Example

The commercially available PVC panel as cited in the comparison example 5 was used for the comparison example.

Figure 6:
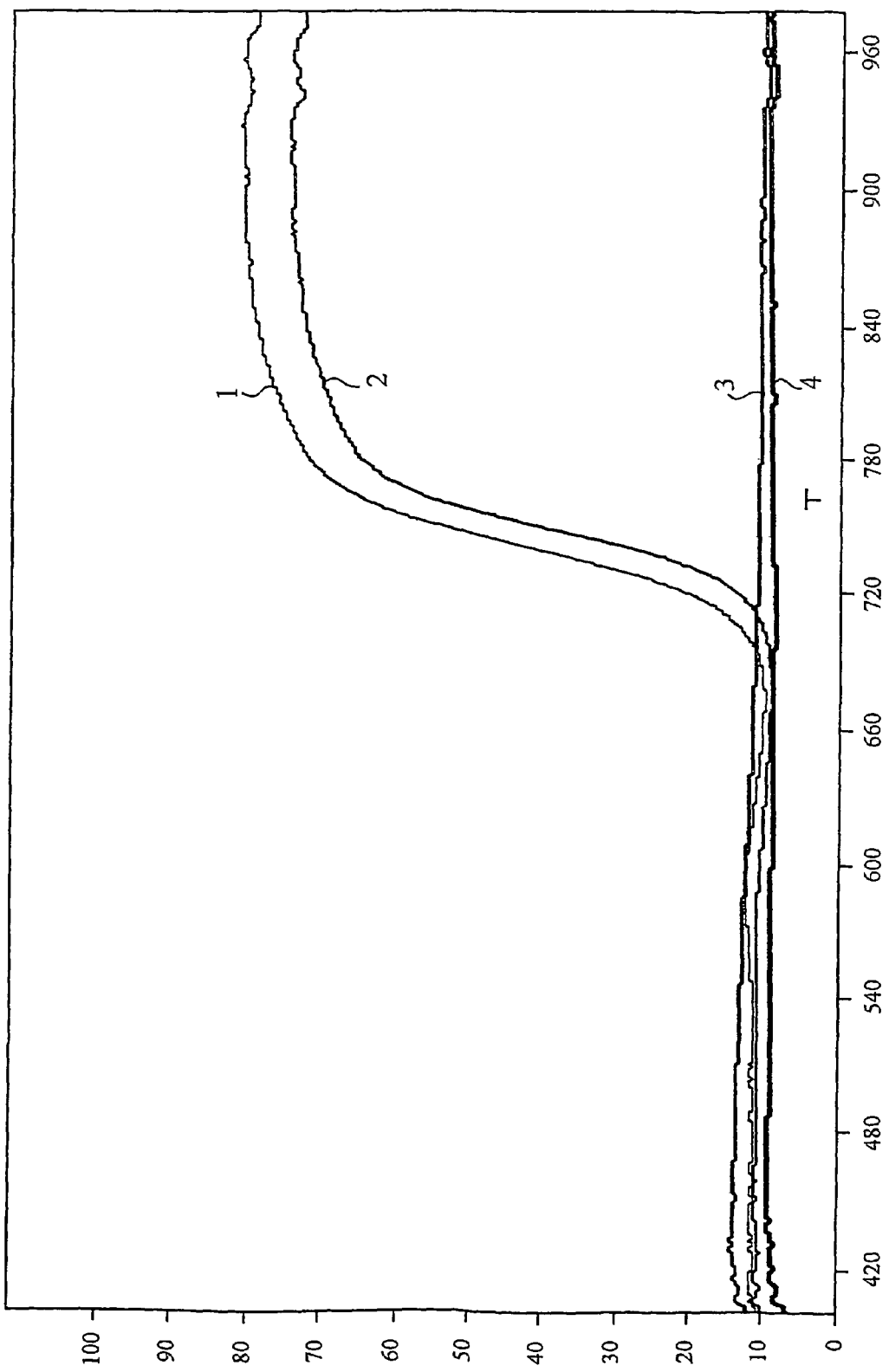

The spectral reflection of the samples was plotted in the range 400 to 980 nm; the plotted results are illustrated in FIG. 6.

The plotted results as shown in FIG. 6 illustrate (1) the spectral reflection of the pigmented epoxy resin panel to be used in accordance with the invention in accordance with example 6a), (2) the spectral reflection of the epoxy resin panel coated in accordance with the invention in accordance with example 6b), (3) the spectral reflection of the commercially available PVC panel and (4) the spectral reflection of the grey coated PVC panel in accordance with the comparison example 5.

The samples were bonded to a panel of expanded polystyrene and measured with a radiation thermometer exposed to 98000 Lx solar radiation.

The grey panel coated in accordance with the invention heated up to 50.5° C. The coated panel in accordance with the comparison example heated up to 65° C.

Example 7

Coating a Leather and Comparison Example a) A leather was dyed beige with the following mixture:
Acid Dye Mixture: (Sella® Fast Beige E) made by TFL USA/Canada Inc.).
b) The leather dyed as per a) was coated beige/gold with

| | |
|---|---|
| 80.00 g | Rodia Base ® VL 8108 made by TFL USA/Canada Inc. |
| 10.00 g | Iriodin 100 Silberperl ® made by Merck |
| 10.00 g | Ropaque ® OP 62 made by Rohm &Haas, |
| 0.35 g | QWD 0108 Magenta made by Sun Chemicals, |
| 1.00 g | YWD 1156 Yellow made by Sun Chemicals, |
| 10.00 g | water. |

The coating was applied wet with a spiral applicator 3×100 μm to the beige dyed leather and then dried.

Comparison Example

A beige pre-dyed leather was coated with a beige standardized coating. The standardized coating consists of an acrylic-copolymer emulsion and an aqueous polyurethane dispersion formulated as specified for the particular application with commercially available waxes, fillers, casein and oil. For beige dyeing an aqueous pigment dispersion of titanium dioxide (rutile), brown and red ferrous oxides and an aqueous dispersion of carbon black was added to this binder mixture.

Figure 7:
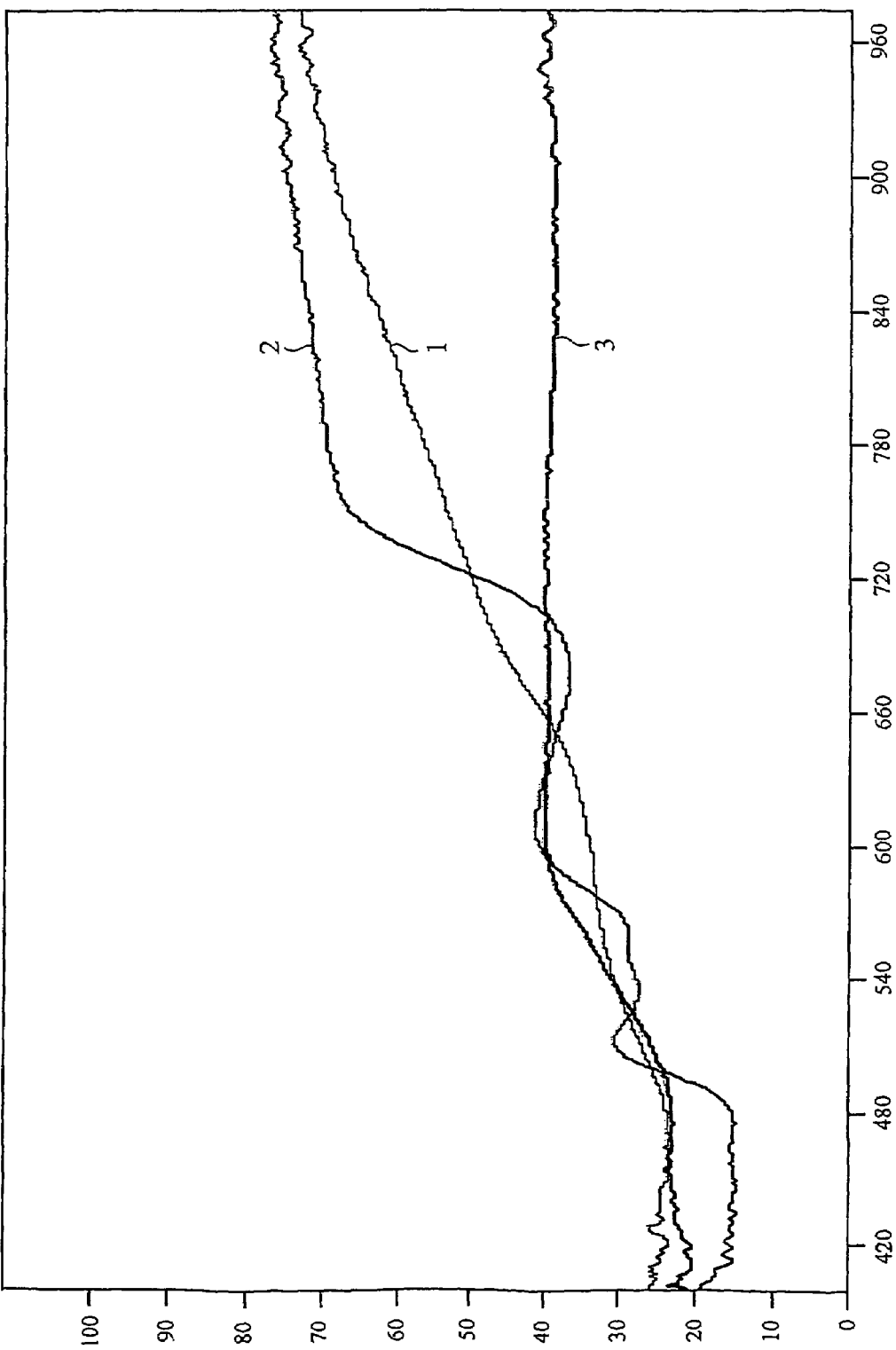

The spectral reflection of the samples was plotted in the range 400 to 980 nm; the plotted results are illustrated in FIG. 7.

The plotted results as shown in FIG. 7 illustrate (1) the spectral reflection of the dyed leather to be used in accordance with the invention in accordance with example 7a), (2) the spectral reflection of the leather coated in accordance with the invention in accordance with example 7b) and (3) the spectral reflection of the leather in accordance with the comparison example.

The samples were bonded to a panel of expanded polystyrene and measured with a radiation thermometer exposed to 98000 Lx solar radiation.

The beige leather coated in accordance with the invention heated up to 45° C. The beige leather in accordance with the comparison example heated up to 53.5° C.

Example 8

Coating a Panel of Epoxy Resin a) An evenly grey pigmented panel of epoxy in accordance with example 5a) was coated otherwise. The panel was coated grey with

| | |
|---|---|
| 40.00 g | APU 1014 binder made by Alberdingk |
| 40.00 g | U 330 binder made by Alberdingk |
| 3.50 g | tinting paste black comprising: |
| | 20 parts by weight Paliogen ® Schwarz L0086 made by BASF, |
| | 80 parts by weight butylene glycol, |
| 10.50 g | Ropaque ® OP 62 made by Rohm &Haas, |
| 00.13 g | QWD 0108 Magenta ® made by Sun Chemicals, |
| 12.00 g | water. |

The coating was applied wet with a spiral applicator 3×100 μm to the evenly grey pigmented panel of epoxy resin and dried.

The spectral reflection of the panel thus produced as well as the heating up due to solar radiation were plotted the same as with the standardized coated epoxy panel in accordance with the comparison in example 5. The results are the same as described in example 5.

Example 9

Coating a Panel of Foamed Epoxy Resin a) An evenly grey pigmented panel of foamed epoxy resin in accordance with example 6a) was coated otherwise. The panel was coated grey with

| | |
|---|---|
| 40.00 g | APU 1014 binder made by Alberdingk |
| 40.00 g | U 330 binder made by Alberdingk |
| 3.50 g | tinting paste black comprising: |
| | 20 parts by weight Paliogen ® Scbwarz L0086 made by BASF, |
| | 80 parts by weight butylene glycol, |
| 10.50 g | Ropaque ® OP 62 made by Rohm &Haas, |
| 0.13 g | QWD 0108 Magenta made by Sun Chemicals, |
| 12.00 g | water. |

The coating was applied wet with a spiral applicator 3×100 µm to the evenly grey pigmented panel of foamed epoxy resin and dried.

The spectral reflection of the panel thus produced as well as the heating up due to solar radiation were plotted in comparison with the standardized coating in accordance with the comparison in example 6. The results are the same as described in example 6.

Example 10

Coating a Panel of Foamed Epoxy Resin and Comparison a) An evenly grey pigmented panel of foamed epoxy as blended in example 6a) was coated otherwise. A grey coating was blended as follows:

| | |
|---|---|
| 50.00 g | Mowilith ® DM 611 made by Hoechst |
| 100.00 g | water plus 2% Tylose ® MH 2000 made by Clariant, |
| 10.00 g | Ferro ® PK 3080 black pigment made by Ferro |
| 2.00 g | glass bubbles S60 made by 3M |

The coating was applied wet with a spiral applicator 2×200 µm to the foamed epoxy resin and oven-dried.

Comparison Example

A commercially available grey PVC panel was coated with a grey standardized coating. The standardized coating consists of an acrylic-copolymer emulsion and an aqueous polyurethane dispersion. For greying an aqueous pigment dispersion of titanium dioxide (rutile), black ferrous oxide and an aqueous dispersion of carbon black was added to this binder mixture.

Figure 8:
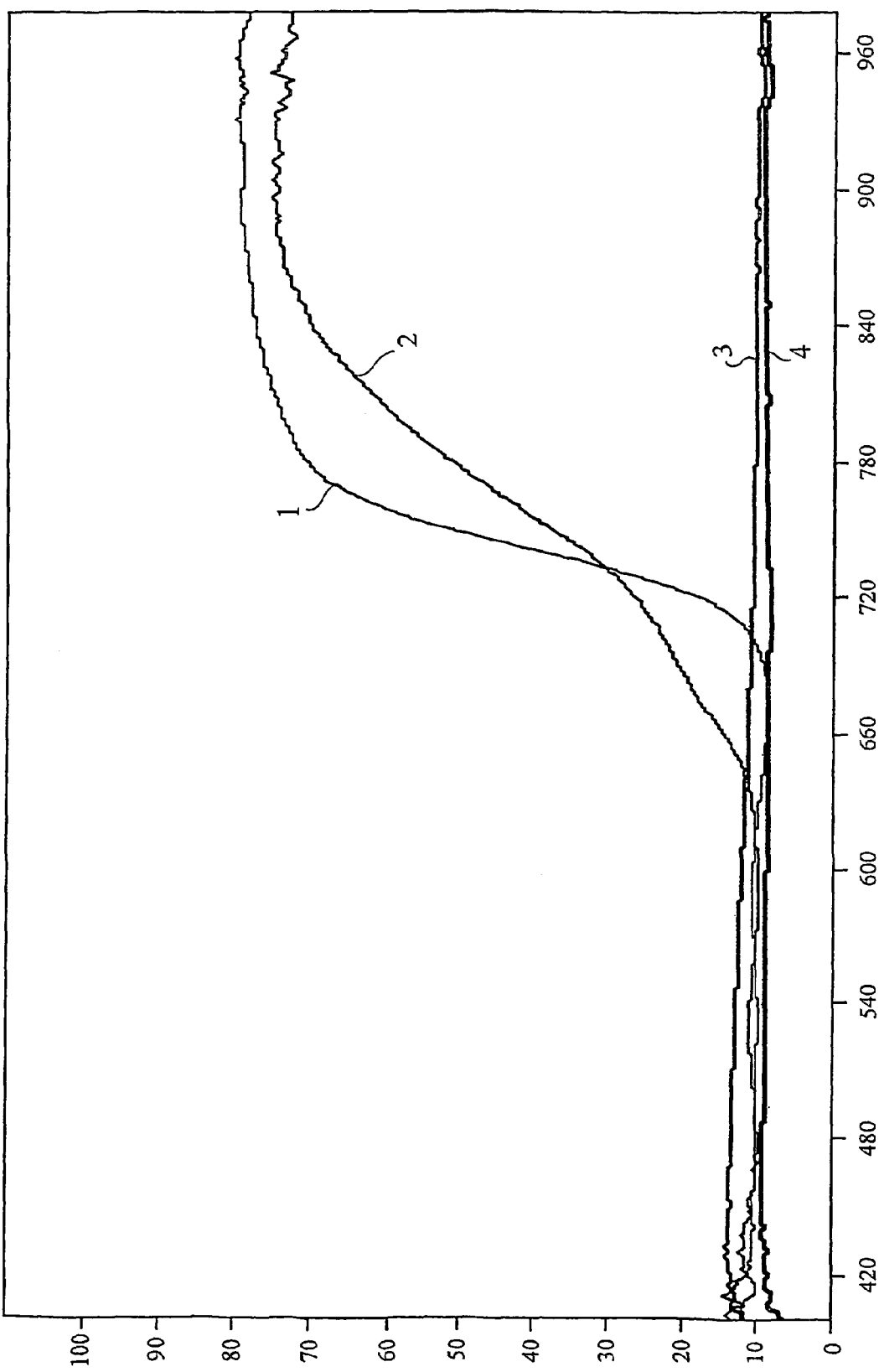

The spectral reflection of the samples was plotted in the range 400 to 980 nm; the plotted results are illustrated in FIG. 8.

The plotted results as shown in FIG. 8 illustrate (1) the spectral reflection of the pigmented epoxy resin panel to be used in accordance with the invention in accordance with example 6a), (2) the spectral reflection of the epoxy resin panel coated in accordance with the invention in accordance with example 10a), (3) the spectral reflection of the commercially available, grey PVC panel and (4) the spectral reflection of the coated PVC panel in accordance with the comparison example.

Example 11

Coating a Leather and Comparison Example a) A leather was dyed black with the following mixture:
Acid Black Mixture: (Sella Fast Black® HS-02 and Sella Fluid Black M-M Made by TFL USA/Canada Inc.)
b) The leather dyed as per a) was coated black with

| | |
|---|---|
| 30.00 g | APU 1014 binder made by Alberdingk |
| 30.00 g | U 330 binder made by Alberdingk |
| 20.00 g | water plus 2% Tylose ® MH 2000 made by Clariant, |
| 00.20 g | defoamer 024 made by Byk |
| 00.30 g | pigment distributor N made by BASF |
| 20.00 g | Ferro ® PK 3080 black pigment made by Ferro |

The coating was applied wet with a spiral applicator 3×100 µm to the dyed leather and then dried.

Comparison Example

The standardized black dyed and coated leather as cited in example 1 was used as the comparison example.

Figure 9:
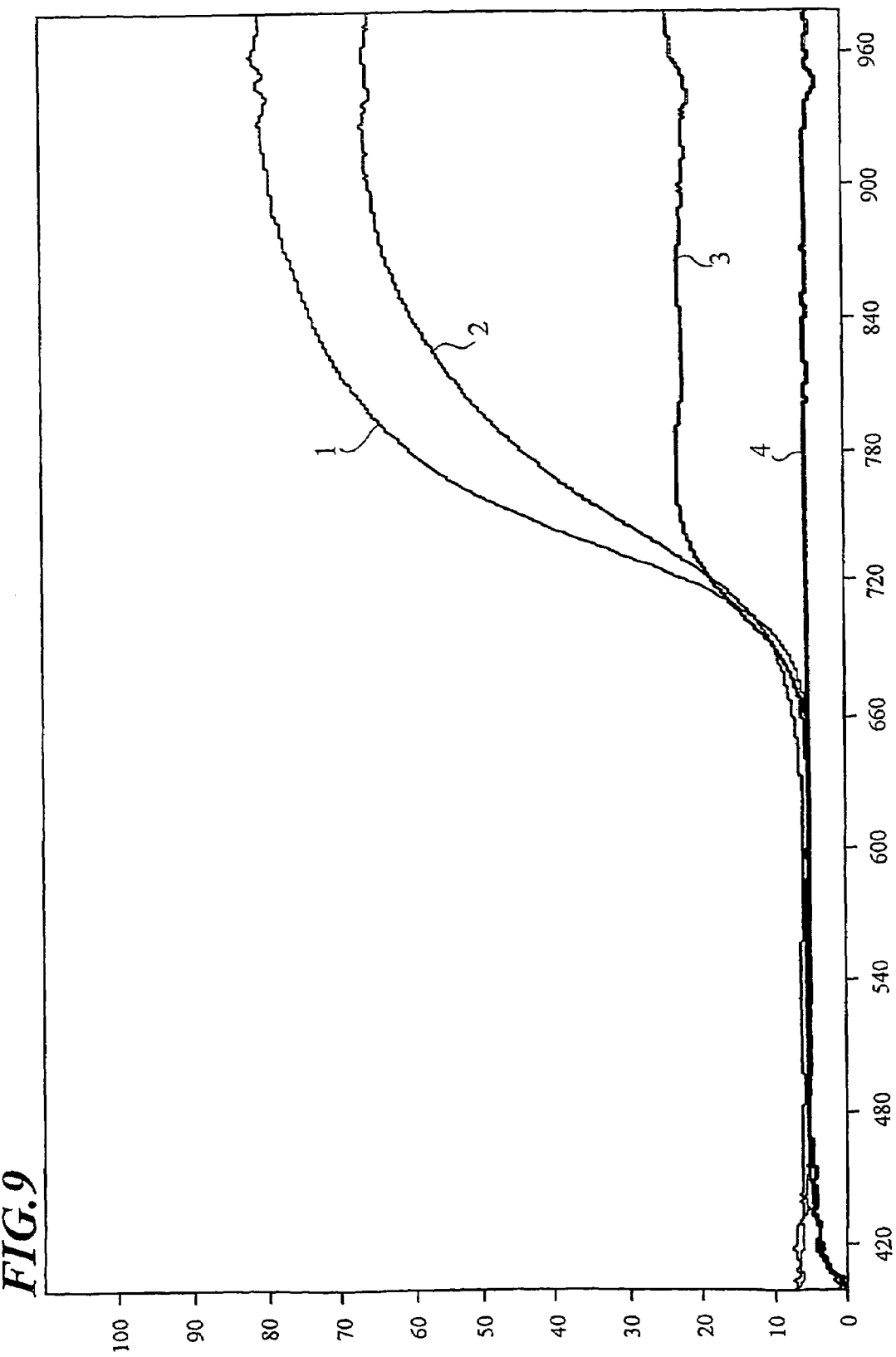

The spectral reflection of the samples was plotted in the range 400 to 980 nm; the plotted results are illustrated in FIG. 9.

The plotted results as shown in FIG. 9 illustrate (1) the spectral reflection of the dyed leather to be used in accordance with the invention in accordance with example 11a), (2) the spectral reflection of the leather coated in accordance with the invention in accordance with example 11b) and (3) the spectral reflection of the dyed leather in accordance with the comparison example and (4) the spectral reflection of the coated leather in accordance with the comparison example.

The samples were bonded to a panel of expanded polystyrene and measured with a radiation thermometer exposed to 98000 Lx solar radiation.

The black leather coated in accordance with the invention heated up to 58° C. The black leather in accordance with the comparison example heated up to 67° C.

Example 12

Coating a Panel of Foamed Epoxy Resin a) An evenly grey pigmented panel of foamed epoxy was prepared as follows:

| | |
|---|---|
| 100.00 g | laminating resin L 160 made by Scheufler Stuttgart, |
| 25.00 g | hardener H 160 made by Scheufler Stuttgart |
| 3.00 g | Expancel ® 461 DE 20 made by Akzo Nobel |
| 0.65 g | QWD 0108 Magenta made by Sun Chemicals, |
| 5.35 g | tinting paste black comprising: |
| | 20 parts by weight Paliogen ® Schwarz L0086 made by BASF, |
| | 80 parts by weight butylene glycol, |
| 20.00 g | zirconium silicate 2 µm made by Wema of Nuremberg | b) A dark green coating was blended as follows:

| | |
|---|---|
| 30.00 g | APU 1014 binder made by Alberdingk |
| 30.00 g | U 330 binder made by Alberdingk |
| 00.20 g | defoamer 024 made by Byk |
| 00.30 g | pigment distributor N made by BASF |
| 30.00 g | Ferro ® PK 4047 green pigment made by Ferro (particle size 1.5 µm) |
| 02.00 g | aerosil 380 made by Degussa |
| 20.00 g | zirconium silicate 2 µm made by Wema |

The coating was applied wet with a spiral applicator 3×100 µm to the evenly grey pigmented panel of foamed epoxy resin.

Comparison Example

A commercially available grey PVC panel was coated with a dark green standardized coating. The standardized coating consists of an acrylic-copolymer emulsion and an aqueous polyurethane dispersion. For the dark green colouration an aqueous pigment dispersion of titanium dioxide (Hostatint made by Hoechst), black ferrous oxide and a green pigment dispersion (Hostatint Grün GG30) was added to this binder mixture.

Figure 10:
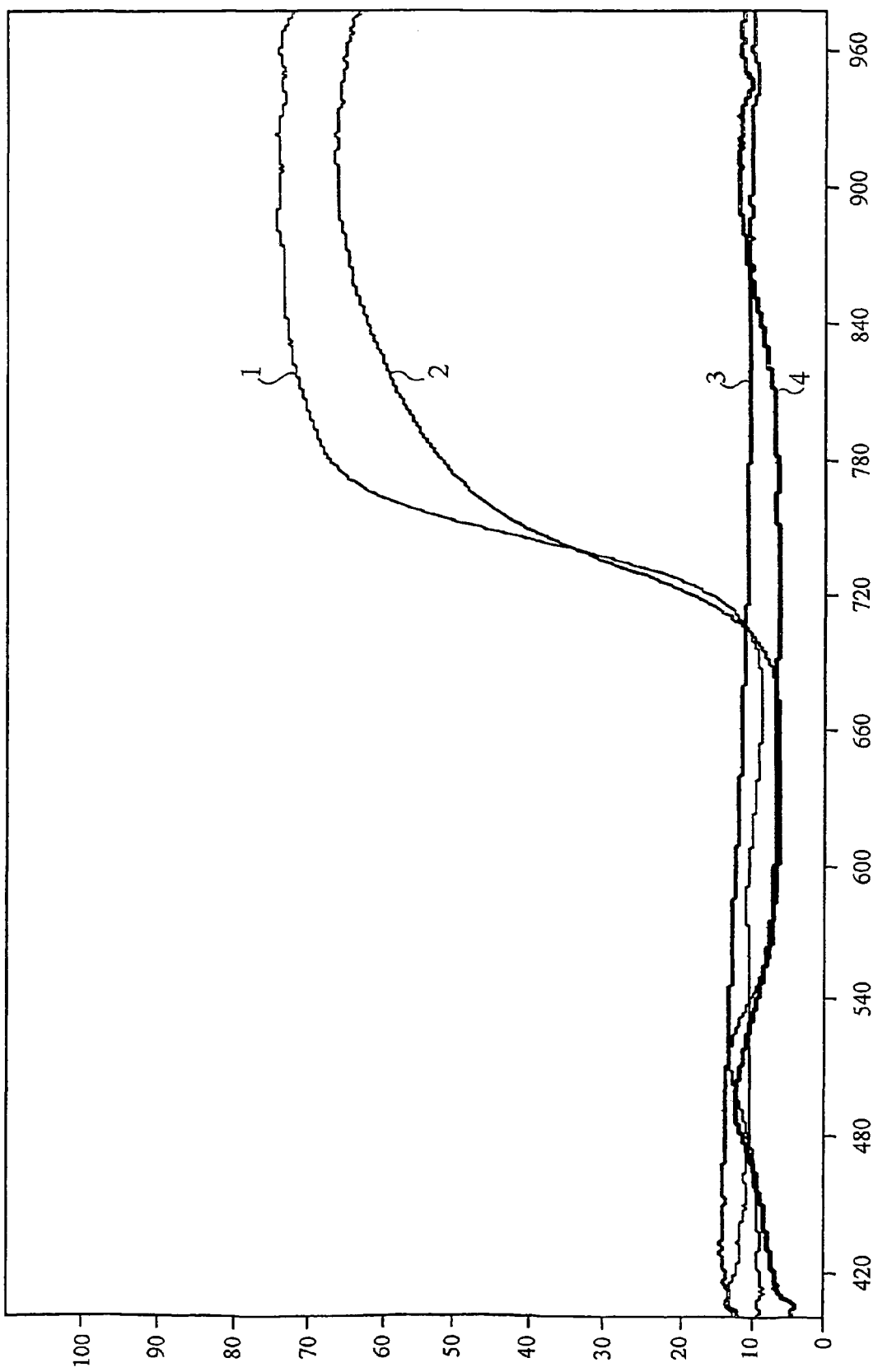

The spectral reflection of the samples was plotted in the range 400 to 980 nm; the plotted results are illustrated in FIG. 10.

The plotted results as shown in FIG. 10 illustrate (1) the spectral reflection of the coloured epoxy resin panel to be used in accordance with the invention in accordance with example 12a), (2) the spectral reflection of the epoxy resin panel coated in accordance with the invention in accordance with example 12b), (3) the spectral reflection of the grey PVC panel and (4) the spectral reflection of the green coloured PVC panel in accordance with the comparison example.

The samples were bonded to a panel of expanded polystyrene and measured with a radiation thermometer exposed to 98000 Lx solar radiation.

The dark green panel coated in accordance with the invention heated up to 53.5° C. The dark green coated PVC panel in accordance with the comparison example heated up to 64° C.

Example 13

Producing a Substrate and Coating a) A dark grey substrate was produced formulated as follows:

| | |
|---|---|
| 50.00 g | water plus 2% Tylose ® MH 200 made by Clariant, |
| 30.00 g | Mowilith DM611 vehicle made by Hoechst |
| 00.20 g | defoamer 024 made by Byk |
| 00.40 g | pigment distributor N made by BASF |
| 80.00 g | zirconium silicate 2 µm made by Wema of Nuremberg |
| 40.00 g | aluminum oxide, calcinated made by Wema |
| 30.00 g | Ropaque ® OP96 made by Rohm &Haas, |
| 26.00 g | tinting paste black comprising: 40 parts by weight water 40 parts by weight butylene glycol, 20 parts by weight Paliogen ® Schwarz L0086 made by BASF, |
| 02.10 g | QWD 0108 Magenta made by Sun Chemicals |

The mixture was dispersed, applied wet with a spiral applicator 1×100 µm to a lab type lacquer test plate and oven dried.

b) An anthracite black coating was produced, formulated as follows:

| | |
|---|---|
| 45.00 g | APU1014 binder made by Alberdingk |
| 45.00 g | U330 binder made by Alberdingk |
| 00.20 g | defoamer 024 made by Byk |
| 00.40 g | pigment distributor N made by BASF |
| 20.00 g | zirconium silicate 1 µm made by Wema |
| 70.00 g | Luxsil hollow microbeads made by Presperse Inc. |
| 20.00 g | tinting paste, black comprising: 40 parts by weight water 40 parts by weight butylene glycol, 20 parts by weight Paliogen ® Schwarz L0086 made by BASF |
| 01.70 g | QWD 0108 Magenta made by Sun Chemicals |
| 10.00 g | water |

The coating was applied wet with a spiral applicator 1×100 µm to the substrate produced as per 13a) and then dried.

Comparison Example

A commercially available anthracite black lacquer was applied wet with a spiral applicator 2×100 µm to a lab type lacquer test plate and oven dried.

Figure 11:
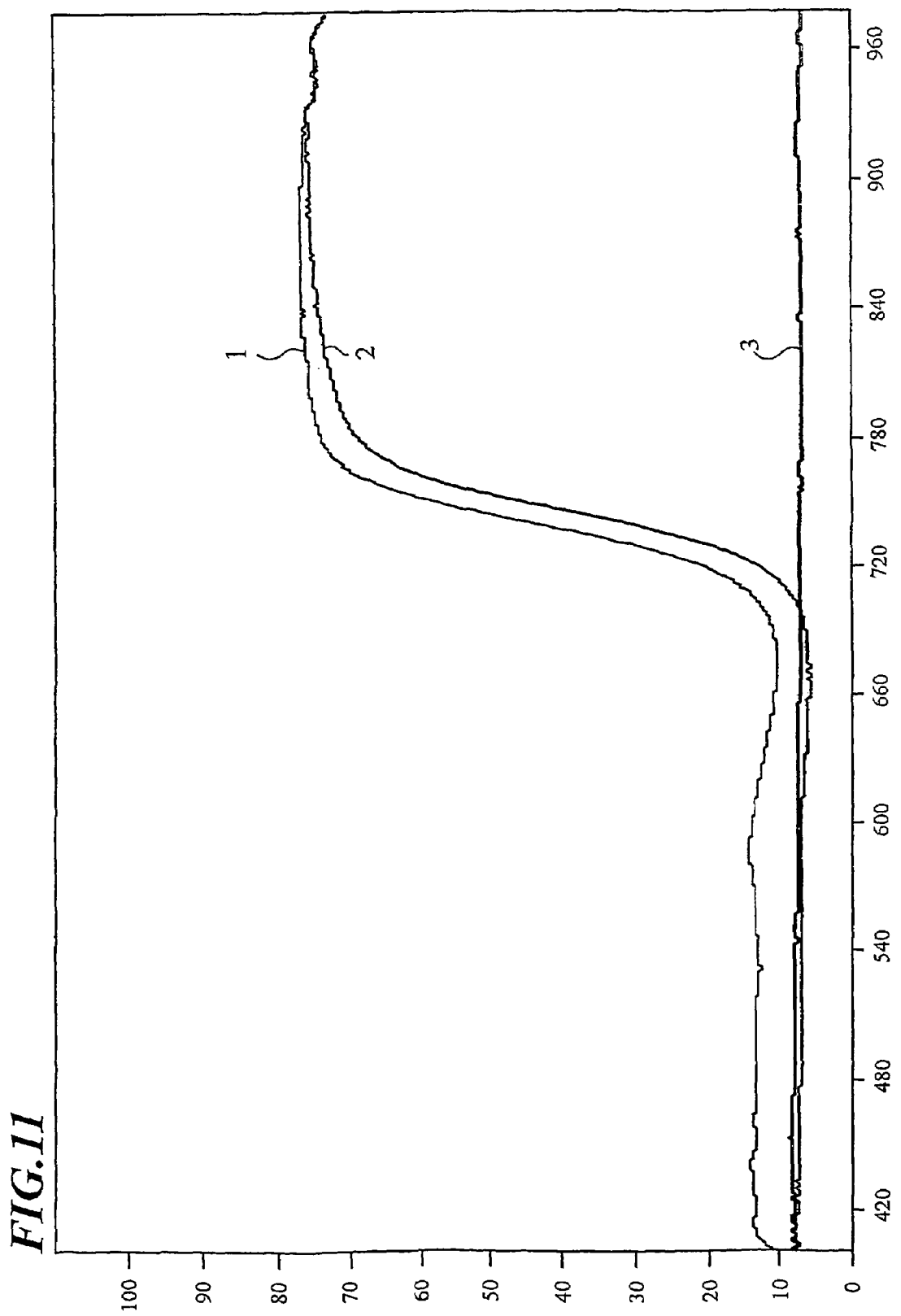

The spectral reflection of the samples was plotted in the range 400 to 980 nm; the plotted results are illustrated in FIG. 11.

The plotted results as shown in FIG. 11 illustrate (1) the spectral reflection of the coloured substrate to be used in accordance with the invention in accordance with example 13a) (2) the spectral reflection of the substrate coated anthracite black in accordance with the invention in accordance with example 13b) and (3) the spectral reflection of the commercially available anthracite black lacquer in accordance with the comparison example.

The invention claimed is:

1. A flat element having a dark surface and exhibiting a reduced solar absorption, the flat element comprising:
   a) a substrate whose reflection in the visible light range from 380 to 720 nm is less than 50% and in the near-infrared range from 720 to 1500 nm exceeds 60%, wherein said substrate is a fibrous material, wherein the fibrous material is selected from the group consisting of: artificial leather and natural leather; and
   b) at least one coating, the coating comprising:
   a binder which in the spectral range of 380 to 1500 nm has a transparency exceeding 70%; and
   a first pigment which imparts in the visible light range from 380 to 720 nm a reflection of the coating less than 50% and in the spectral range of the near-infrared range from 720 to 1500 nm a transparency exceeding 50%, wherein the particle size of said first pigment is smaller than 0.9 µm and said first pigment is selected from the group consisting of: organic pigments, azo pigments, monoazo, disazo, β-naphtol, naphtol AS, lacquered azo, benzimidazolon, disazo condensation, metal complex, isoindolinon and isoindolin pigments, polycyclic pigments, phthalocyanine, chinacridon, perylene, perinon, thioindigo, anthraquinone, anthrapyrimidin, flavanthrone, pyranthrone, anthanthrone, dioxazine, triarylcarbonium, chino-phthalone, and diketo-pyrrolo-pyrrole pigments.

2. The flat element of claim 1, characterized in that the reflection of said substrate in the visible light range from 380 to 720 nm is less than 50% is due to colouration with soluble dyes or pigments.

3. The flat element of claim 2, characterized in that said soluble dyes are water-soluble dyes selected from the group consisting of: acidic dyes, substantive dyes, basic dyes, developed dyes, sulphuric dyes, and aniline dyes, and dyes soluble in zapon dyes.

4. The flat element of claim 1, characterized in that said substrate is filled with fillers to 40 to 80 percent volume, having in the wavelength range 380 to 1500 nm a transparency exceeding 70% and whose particle size provides a low backscatter in the visible light range,
   wherein said fillers are selected from the group consisting of: degradable minerals, metal oxides, aluminum oxide, magnesium oxide, quartz, blends of metal oxides, zirconium silicate, clay, metal carbonates, calcium carbonate, metal sulfates, and barium sulfate, and
   wherein the average particle size of said fillers is set by grinding to an average of 1 to 3 µm.

5. The flat element of claim 1, characterized in that said binder is
(a) a solvent-based binder selected from the group consisting of: acrylates, methacrylates, styrene-acrylates, styrene-methacrylates, substituted polyolefins, polystyrene and styrene, alkyd resins, saturated and non-saturated polyesters or polyamides, polyimides, polyurethanes, polyethers, epoxy resins, silicones, chiorosulfonated polyethylene, fluorated polymers, fluorated acrylic copolymers, and fluorosilicones; or
(b) an aqueous binder selected from the group consisting of: alkyd resins, polyesters, polyacrylates, epoxides and epoxide esters, aqueous dispersions and emulsions based on acrylate, methacrylate, styrene acrylate, polyethylene, polyethylene oxidate, ethylene acrylic acid copolymers, methacrylate, vinylpyrrolidone-vinylacetate copolymers, polyvinylpyrrolidone, polyisopropylacrylate, polyurethane, wax dispersions based on polyethylene, polypropylene, Teflon®, synthetic waxes, fluorated polymers, fluorinated acrylic copolymer in aqueous solution, and fluorosilicones.

6. The flat element of claim 1, characterized in that the reflection of said substrate in the spectral range 720 to 1500 nm exceeds 70%.

7. The flat element of claim 1, characterized in that the reflection of said substrate or said coating in the spectral range of visible light from 380 to 720 nm is less than 40%.

8. The flat element of claim 1, characterized in that the substrate is mechanically foamed by the inclusion of microbubbles of glass or plastic.

9. The flat element of claim 1, characterized in that the layer thickness of said substrate is in the range from 20 μm to 6 mm.

10. The flat element of claim 1, characterized in that the layer thickness of said coating is in the range from 10 μm to 500 μm.

11. A method of producing the flat element of claim 1, the method comprising:
applying and drying a substantially evenly coloured fluid coating to at least one surface of a substrate whose reflection in the visible light range from 380 to 720 nm is less than 50% and in the near-infrared range from 720 to 1500 nm exceeds 60%, said coating having a transparency exceeding 70% in the spectral range of 380 to 1500 nm and comprising a first pigment which in the visible light range from 380 to 720 nm of the coating result in a reduced reflection of the coating less than 50% and in the spectral range of the near-infrared range from 720 to 1500 nm show a transparency exceeding 50% and a second pigment which in the visible light range from 380 to 720 nm of said coating results in a reduced reflection of the coating less than 50% and in the spectral range of the near-infrared range from 720 to 1500 nm shows a reflection exceeding 40%, said coating being applied as a single layer or several layers to said substrate.

12. The flat element of claim 1, characterized in that the coating further comprises a second pigment which imparts in the visible light range from 380 to 720 nm a reflection of the coating less than 50% and in the spectral range of the near-infrared range from 720 to 1500 nm a reflection exceeding 40%, the particle size of said second pigment being greater than or equal to 0.9 μm, said second pigment being selected from the group consisting of: inorganic pigments, metal oxides and hydroxides, cadmium, bismuth, chromium, ultramarine, coated, laminar mica pigments, rutile mixed phase pigments, and spinelle mixed phase pigments.

13. The flat element of claim 12, characterized in that said first or said first and second pigments provide the coating with a low reflection of less than 40%.

* * * * *